United States Patent Office 3,698,972
Patented Oct. 17, 1972

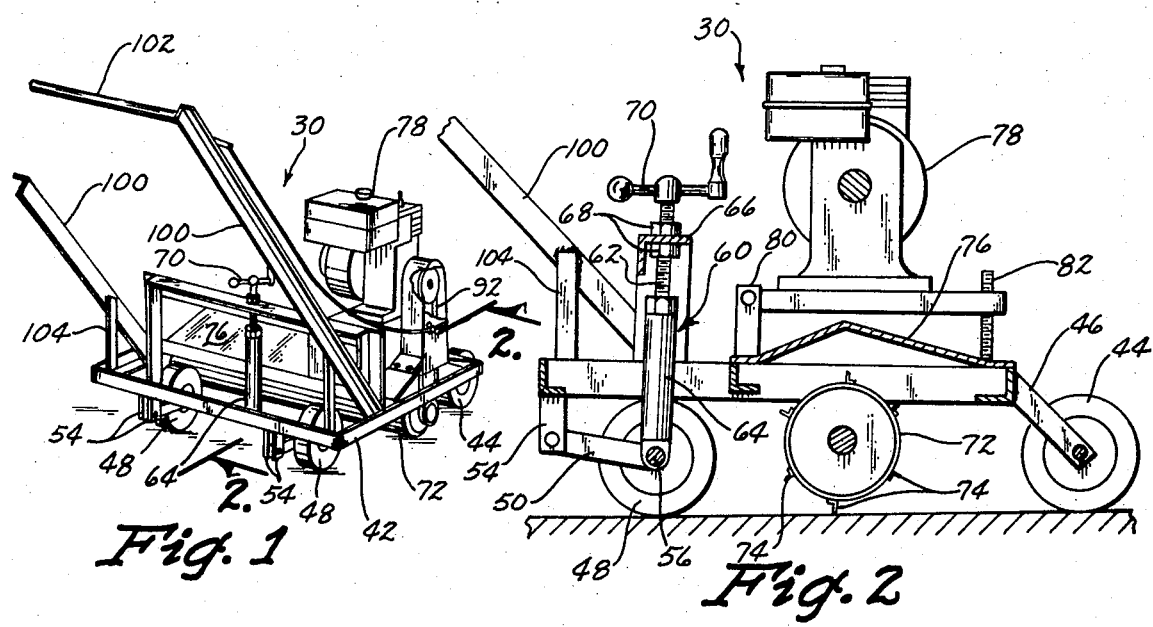
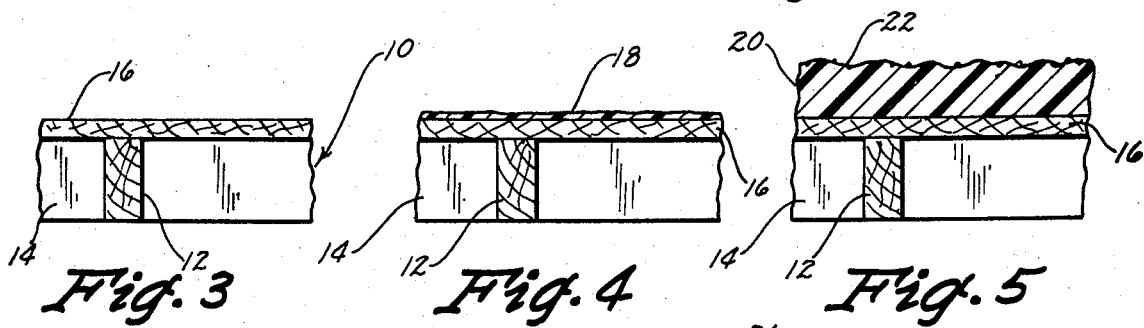
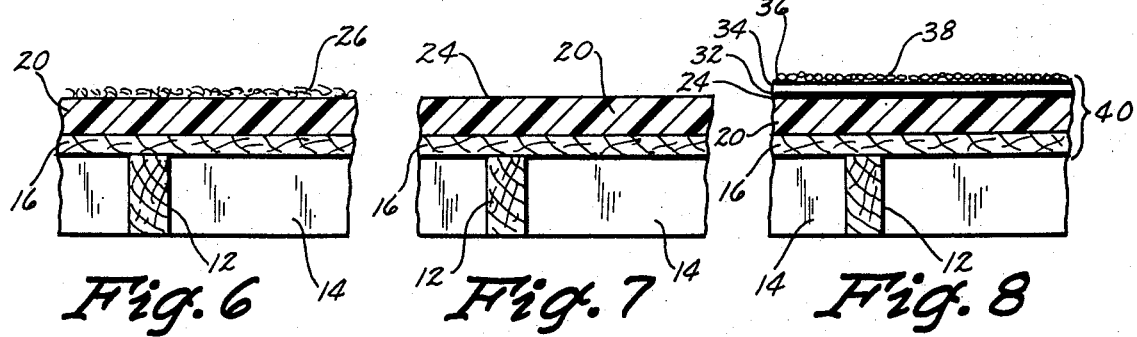

3,698,972
METHOD OF SEALING AND INSULATING A ROOF CONSTRUCTION
James Lenzner, 123 Arizona, Waterloo, Iowa 50703
Filed Aug. 14, 1968, Ser. No. 752,597
Int. Cl. E04b 2/00
U.S. Cl. 156—71      6 Claims

ABSTRACT OF THE DISCLOSURE

The method including spraying a cellular plastic film onto the roof structure, allowing the cellular plastic to expand to the desired thickness, and shaving the expanded plastic to provide a smooth surface suitable for the application of a built-up roof or other protective coatings. Tar, tar paper and additional tar or other protective coatings are then applied to the smooth expanded plastic. The expanded plastic is shaved by a machine having a rotatable drum and includes adjustment means for varying the thickness of the cut.

---

A flat or slope roof structure or the like which is not shingled is sometimes covered with tar and tar paper and other protective coatings and perhaps some rock, mineral aggregate or other protective coatings. The sealing methods without shaving to a smooth surface are generally unsatisfactory.

It is a feature of this invention to apply a thin film of sprayqed plastic onto the roof structure first. The spray plastic develops a cellular type which will immediately expand 20 to 30 times its film thickness and will set up in five to ten seconds and thereupon may be shaved to a smooth surface. The expanded layer of insulative plastic may easily be as thick as eight inches after having been sprayed on a film having a thickness of $\frac{1}{20}$ inch to $\frac{1}{32}$ inch. The spraying of the cellular plastic includes using a blowing agent which decomposes to liberate a gas. This urethane or expanded plastic foam insulation can be applied to any roof deck whether it be wood, steel, concrete or other forms of roof decking material.

Upon completion of the application of the expanded cellular plastic, preferably urethane foam, the foam is shaved with a hand-operated shaving device include a rotatable cylinder carried on a frame driven by a gas engine. Longitudinally extending blades are formed on the cylinder and the cylinder is adjustably positioned above the working surface by adjustment of ground support wheels carried on a pivotal axis which may be raised and lowered to provide the desired cutting thickness. Next, the shavings are sweept or vacuumed in preparation for application of tar, tar paper, or other protective coatings.

The cellular plastic urethane foam not only has sealing and insulative properties but provides substantial structural support strength and adds only a very minimum additional weight to the roof covering.

These and other features and advantages of this invention will become readily apparent to those skilled in the art upon reference to the following description when taken into consideration with the accompanying drawings, wherein:

FIG. 1 is a perspective view of the shaving machine used in the method of this invention;

FIG. 2 is a cross-sectional view taken along line 2—2 in FIG. 1 of the shaving machine;

FIG. 3 is a fragmentary cross-sectional view of a roof structure before any covering material is applied;

FIG. 4 is a cross-sectional view showing a thin film of cellular plastic having been applied to the roof structure;

FIG. 5 is a cross-sectional view of the roof structure illustrating the cellular plastic in its expanded condition and having a rough outer surface;

FIG. 6 is a cross-sectional view of the roof structure illustrating the expanded plastic having been shaved with shavings remaining thereon;

FIG. 7 illustrates the roof structure after the shavings have been removed leaving a smooth surface; and FIG. 8 is a cross-sectional view of the roof structure illustrating the laminated package of expanded plastic, tar, tar paper, tar and gravel or other protective coating.

The method of this invention involves a roof structure generally referred to by the reference numeral 10 in FIG. 3 which includes supporting 2 x 4's 12 and 14 on which flooring boards 16 are placed.

The first step in the method of this invention is to apply from a spray gun a thin film, $\frac{1}{20}$ to $\frac{1}{32}$ inch thick of preferably urethane cellular plastic 18 and then wait for approximately five seconds for it to expand 20 to 30 times its original thickness to the thickness shown in FIG. 5 at 20. The outer surface 22 is rough and undulated and thus is shaved to a smooth surface 24 as seen in FIGS. 6 and 7. The shavings 26 in FIG. 6 are produced by the machine generally referred to by the reference numeral 30 of FIGS. 1 and 2 and will be discussed in detail hereinafter.

The next step is the application if desired of tar 32 and tar paper 34 with a final layer of film of tar 36 onto the expanded urethane foam 24. Finally, gravel or rock 38 is applied to the top film of tar 36 to complete the roof covering indicated at 40 in FIG. 8.

The shaving machine 30 includes a frame 42 having front support wheels 44 positioned on downwardly and forwardly extending brackets 46. Adjustable support depth gauge wheels 48 are carried on arms 50 pivotally connected to the rear of the frame 42 between a pair of downwardly extending brackets 54. An axile 56 extends between the two wheels 48 and through the forward ends of the pivotal arms 59. An upwardly extending adjustment unit 60 including a threaded bolt 62 and a socket sleeve 64 is provided wherein the bolt 62 extends through an upwardly extending frame member 66. Lock nuts 68 are provided on opposite sides of the frame member 66 to retain the desired extension of the adjustment unit 60. A handle member 70 is position on the upper exposed end of the bolt 62 for manual adjustment of the adjustment unit 60.

The frame 42 intermediate its ends carries thereunder a powered rotatable cylinder 72 having uniformly spaced apart longitudinally extending cutting blades 74 around its periphery. A shield 76 extends above the cutting drum 72 to retain the shavings 26 below the shaving machine. A gasoline engine 78 is mounted on a stationary support 80 at the rear and is pivotally adjustable upwardly by a threaded bolt member 82 at the forward end which when adjusted upwardly tightens a drive belt 92 connected to the engine 78. Accordingly the desired tension in the drive belt 92 is maintained by adjustment of the bolt 82 which pivotally raises and lowers the motor 78 about the pivotal axis extending through the support member 80 at the rear of the engine.

A rearwardly extending control handle 100 is provided for steering the shaving machine. The handle 100 includes a pair of side members interconnected by a cross member 102 and has upwardly extending support braces 104 at its lower end.

Thus it is seen that in operation a roof covernig may be quickly, easily and inexpensively applied to most roof structures and provide effective sealing and insulating of the roof as well as increasing its structural strength through the use of the cellular plastic urethane foam at a minimum increase in total roof weight. The urethane foam is quickly applied without any messiness since it quickly sets up in five seconds or less and may be shaved to the desired smoothness. The final application of tar, tar paper and tar with a layer of rock or other protective coatings completes the roof covering and provides the ultimate in a roof structure. It is apparent that if tar and tar paper and rock and other protective coatings were used to give the same insulative and sealing properties of the cellular expanded urethane the weight and cost would be extremely prohibitive. Further, urethane is an unusually fine material for this purpose since it is additionally not inflammable and practically no solvent will effect it thus the solvents in tars will not adversely affect the urethane foam. In addition it is extremely low in transmission of water vapor and absorption of water. The smooth shaved surface 24 provided by the shaving machine 30 provides an excellent surface for the adhesion of the tar material to the expanded cellular plastic 20.

Some changes may be made in the construction and arrangement of my method of sealing and insulating a roof construction without departing from the real spirit and purpose of my invention, and it is my intention to cover by my claims, any modified forms of structure or use of mechanical equivalents which may be reasonably included within their scope.

I claim:

1. A method of sealing and insulating a roof construction comprising the steps of,
spraying onto the roof structure a cellular plastic film having a blowing agent which decomposes to liberate gas and produce expanded plastic material having a desired thickness, and
shaving the expanded plastic to provide a smooth surface.

2. The method of claim 1 wherein said plastic is a urethane foam material.

3. The method of claim 1 wherein said shaving step includes the use of a rotating drum having a plurality of blades on its periphery and moving said rotating drum over and on the expanded plastic material.

4. The method of claim 1 wherein after said shaving step the shavings are removed from the resulting smooth surface.

5. The method of claim 3 wherein said smooth plastic surface is coated with a protective coating.

6. The method of claim 4 wherein said protective coating includes a sheet of tar paper which is laid on a coating of tar and a second coating of tar is applied to said tar paper and a layer of gravel is placed on said second coating of tar.

References Cited
UNITED STATES PATENTS

| | | | |
|---|---|---|---|
| 3,094,447 | 6/1963 | Chamberlain | 156—71 |
| 3,511,007 | 5/1970 | Babcock | 156—71 X |
| 3,492,192 | 1/1970 | Bullard IV | 156—78 X |

CARL D. QUARFORTH, Primary Examiner

S. J. LECHERT, JR., Assistant Examiner

U.S. Cl. X.R.

156—78, 250, 267, 278, 279, 280, 297, 337; 52—746; 161—238; 117—4, 62, 100, 104